United States Patent [19]
Mathews

[11] 3,760,813
[45] Sept. 25, 1973

[54] COMBINE WITH GRAIN BIN BENEATH SIEVES

[76] Inventor: Bernard C. Mathews, P.O. Box 70, Crystal Lake, Ill. 60014

[22] Filed: Dec. 9, 1971

[21] Appl. No.: 206,448

[52] U.S. Cl. ............................ 130/27 HF, 130/27 R
[51] Int. Cl. ............................................ A01f 12/18
[58] Field of Search ..................... 130/27 R, 27 HF; 56/12.9, 13.1; 214/17 C, 42 R, 519, 83.32; 296/25

[56] References Cited
UNITED STATES PATENTS

| | | | |
|---|---|---|---|
| 3,339,758 | 9/1967 | Hubert et al. | 214/83.32 |
| 2,233,181 | 2/1941 | Quartullo | 296/25 |
| 2,776,770 | 1/1957 | Laber et al. | 214/83.32 |
| 3,193,995 | 7/1965 | Miller | 130/27 R |
| 2,849,118 | 8/1958 | Ashton | 130/27 HF |

*Primary Examiner*—Antonio F. Guida
*Attorney*—Zabel, Baker, York & Jones

[57] ABSTRACT

The combine has the threshing cylinder, the grain separating mechanism, and the casing containing same located entirely above the wheels. the grain bin is located beneath the casing in the space between the wheels, and is substantially wider than the casing. The engine is mounted on a cantilevered drop frame behind the rear wheel with the engine base lower than the top of the wheels, and beneath the rear part of the grain separating means. The fan and its intakes are located high above the ground. A boom type grain delivery means has a portion extending vertically upward from the grain bin outside of the casing.

8 Claims, 4 Drawing Figures

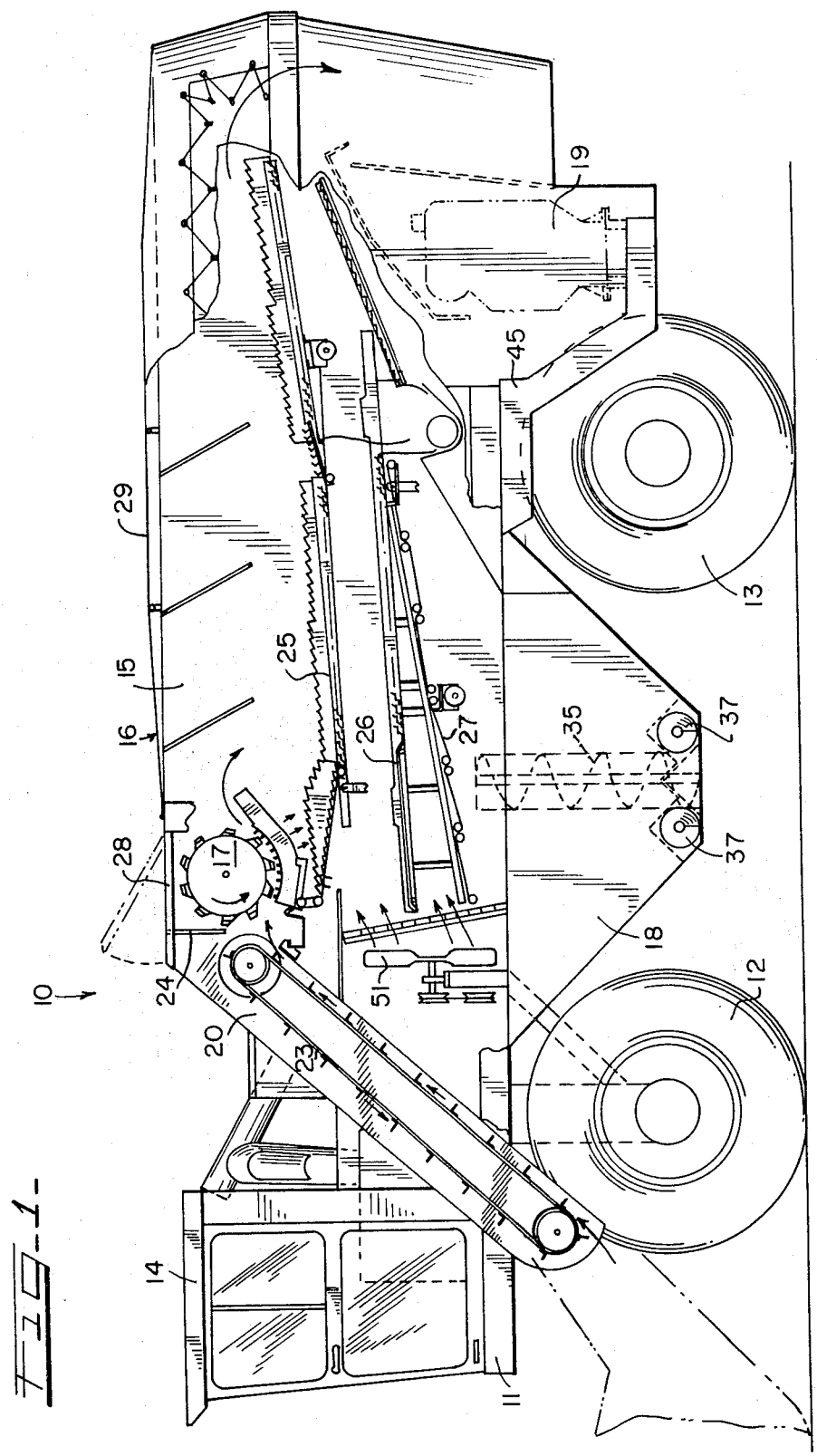

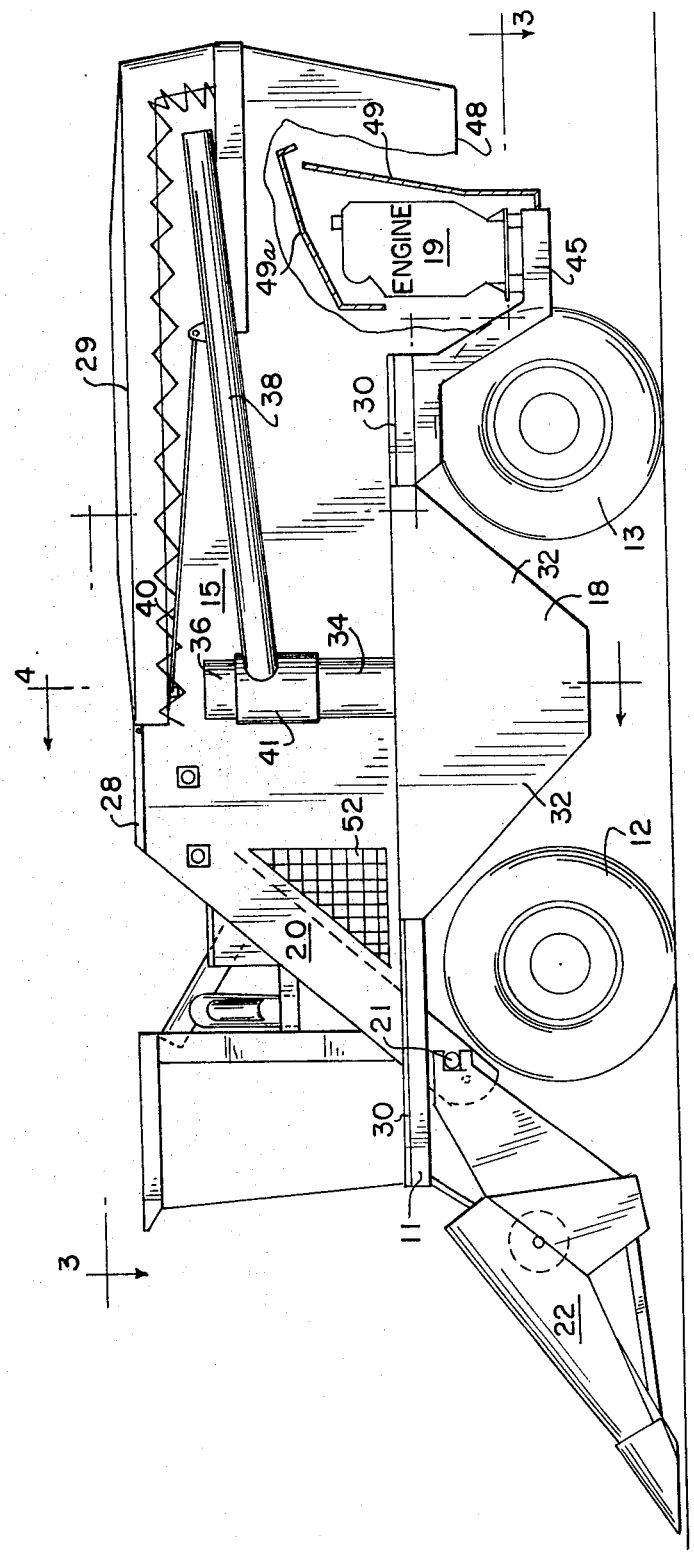

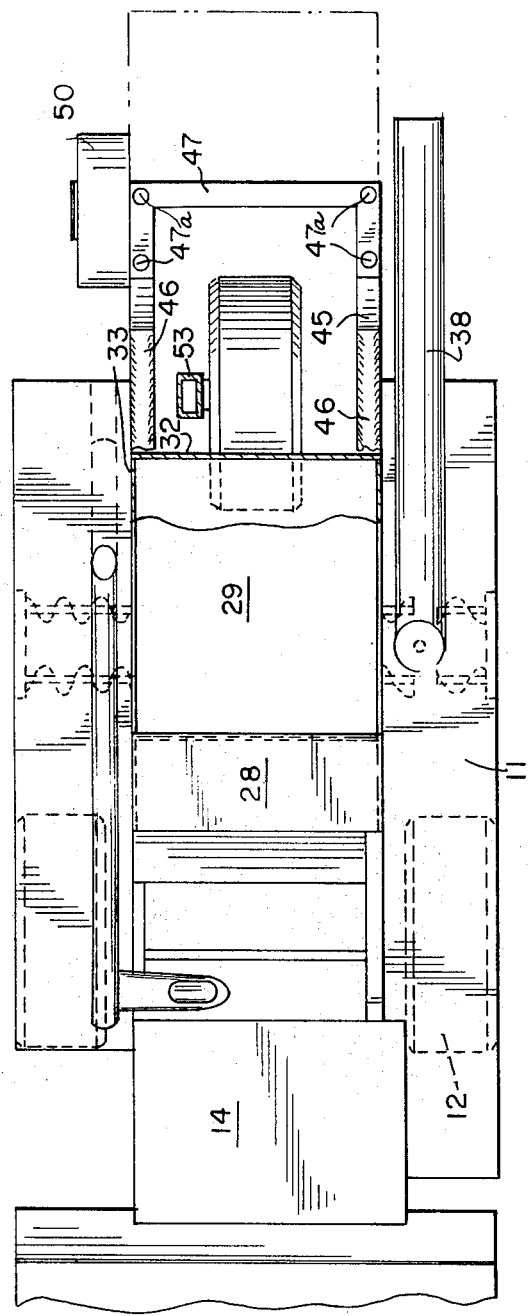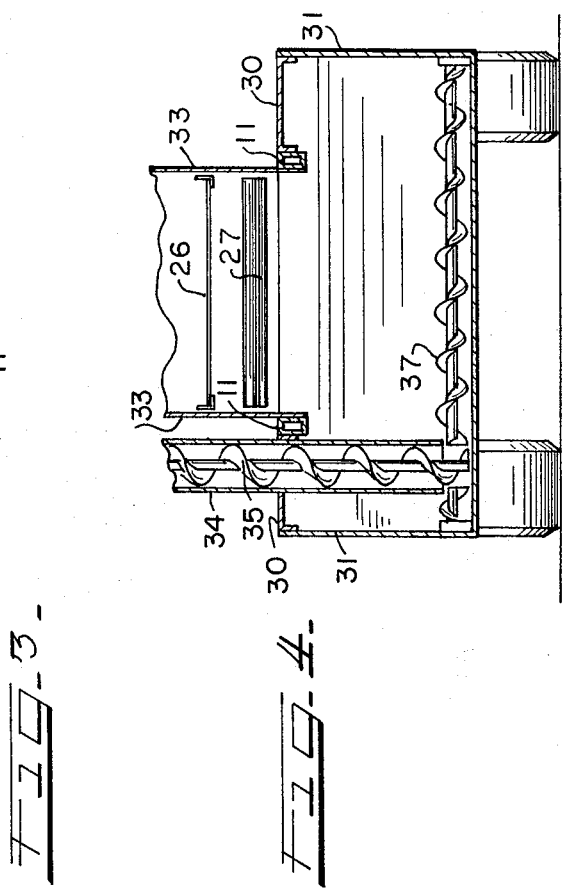

COMBINE WITH GRAIN BIN BENEATH SIEVES

This invention relates to an improved combine for harvesting grains, such as wheat and corn.

It is an object of the present invention to provide a combine of improved stability, and one which is suitable for operation in soft ground.

The usual combine comprises a threshing cylinder and separating mechanism in the lower part of the enclosure, and the grain bin is located above the mechanism. As a result, as the grain bin becomes filled, the center of gravity of the combine is progressively raised. In operating on irregular terrain, such as hillsides, or embankments of irrigation ditches, there is increased possibility of having the combine tip over, due to the increasing elevation of the center of gravity.

It has been proposed in Miller U.S. Pat. No. 3,193,995 to locate the crop handling mechanism in the upper half of the combine, and locate the grain bin below the crop handlin mechanism. According to this inverted arrangement, if the combine is reasonably stable when empty, its stability will be increased as it becomes filled with grain.

However, the Miller construction does not take full advantage of this inverted arrangement because the lower half of the combine beneath the straw walker is divided longitudinally into three parts, the two outer parts each containing a separate sieve and a separate grain bin and the center section accommodating the engine.

According to my invention, I not only provide a bin which extends continuously from one side of the combine to the other, but I am enabled to extend the bin laterally beyond the side walls of the casing for the mechanism, thus providing a greatly increased grain collecting capacity, and providing correspondingly increased stability against tipping as the grain bin becomes filled.

Another advantage of my arrangement is that the crop handling mechanism is at a sufficiently high elevation so that the rear wheel means can be located beneath the mechanism and far enough forward of the straw discharge opening so that the wheel supporting structure, steering mechanism, and any drive means will not be clogged by the straw being discharged.

Furthermore, this arrangement gives one considerable latitude in the design of a suitable steerable wheel mechanism. For instance, the rear wheel means can be a single steerable rear wheel making a three wheel combine. In the alternative, the usual pivoted axle of a four wheel combine may be employed, and in this event, the large amount of clearance between the mechanism and the ground permits the use of much larger steerable wheels than is now the practice. With large wheels, it is possible to maximize the power on each wheel when individual driving means for all of the wheels of the combine are provided. Furthermore, it is possible to use flotation tires for improved operation in soft ground.

Also it is possible with the present arrangement to achieve substantially equal weight distribution on all wheels by locating the engine at the rear end of the combine and at a point far enough beyond the rear wheel means so as to act as a counterbalance for the relatively heavy harvesting head which is removably secured to the front end of the combine.

Because of the heavy multi-row corn heads and cutting platforms with pick-up reel assemblies, the present day combines tend to be lightly loaded on the rear wheels and in some cases require rear end weights for stable steering. Therefore, the location of the engine according to my invention, provides a substantial improvement in combine design. In addition to the rear end location, the engine is positioned low enough to allow some of the crop handling mechanism to process crop above the engine, but high enough to clear any cut and spread straw or crop residue on the ground, particularly when being driven across a previously harvested field. A further advantage of this engine location is that it is easily accessible for servicing, and it is open underneath so that straw and chaff will not accumulate so as to constitute a fire hazard due to oil drip.

In order to best achieve the foregoing results, I locate the threshing cylinder at the upper front end of the mechanism casing and provide a long feeder chain which delivers the cut crop from the grain header to the cylinder. From this point onward, the flow of grain is essentially downwardly through a specially designed grain separating mechanism which provides a low profile, the grain dropping from the cleaning shoe directly into the bin. Thus the use of the conventional clean grain elevator is eliminated as well as various intermediate elevator devices which are sometimes used.

Furthermore, by locating the threshing cylinder close to the top of the casing, it is possible to mount it so that the cylinder is readily accessible through the top of the casing for clearing out jammed crop, and for removal and replacement of the cylinder.

Conventional combines have very little room between the crop handling mechanism and the ground clearance line to accommodate the cleaning fan. Furthermore, the low elevation of the standard cleaning fan requires special shielding to avoid sucking up trash, straw and chaff from the ground and blowing it into the grain.

According to my arrangement, the location of the grain separating mechanism is such that a substantial area is available for the fan plenum behind and beneath the feeder chain, and which is at an elevation sufficiently high that the air intake is located at a point where it does not suck up straw from the ground.

Other objects, features and advantages of my invention will become apparent as the description proceeds.

In the drawings:

FIG. 1 is a side elevation of a combine embodying my invention, a portion of the side wall being removed and some of the elements being shown diagrammatically;

FIG. 2 is a side elevation similar to FIG. 1, but showing the external features of the combine;

FIG. 3 is a plan view taken along line 3—3 of FIG. 2; and

FIG. 4 is a vertical section taken along line 4—4 of FIG. 2.

FIG. 1 shows a combine 10 which includes a horizontal frame 11, two front wheels 12 and a rear wheel 13. An operator's cab 14 is mounted at the front end of the frame 11, and a casing 15 is mounted on the frame rearwardly of the cab, the crop handling mechanism 16 including a threshing cylinder 17 being contained within the casing 15. A grain bin 18 extends downwardly from the frame 11 between the front and rear wheels 12 and 13, as shown in FIG. 1. A suitable internal combustion engine 19 is mounted at the rear end of the frame 11.

Extending diagonally upward from beneath the cab is a feeder conduit 20 which communicates with the upper front end of the casing 15. The lower end of the feeder conduit terminates in a header mount 21 on which a header 22 can be removably mounted for harvesting a particular type of grain or crop. A slat type elevator 23 is disposed within the feeder conduit 20 and extends from the corn head 22 shown up to the threshing cylinder 17 which is located in the upper front portion of the casing 15. A removable vertical plate 24 is disposed forwardly of the threshing cylinder 17 and extends downwardly into proximity with the upper or sprocket drum of the slat type elevator 23 to prevent material carried around the cylinder from being passed forward down the feeder chain, and to prevent down draft from cylinder windage in the upper front portion of the feeder conduit.

The crop handling mechanism 16 also includes grain separating mechanism comprising an upper sieve 25 and a lower sieve 26 located rearwardly of and beneath the cylinder 17. The foregoing elements are described in greater detail in my copending application Ser. No. 186,053 filed Oct. 4, 1971 to which reference is hereby made. Suitable means are provided for vibrating the sieves 25 and 26 in opposed phase relationship, and a canvas barrier 27 moving with the lower sieve 26 is located between the lower sieve 26 and the grain bin 18, all as described in said copending application.

A top plate 28 closes the front end of the casing 15 above the cylinder 17, and a removable tarpaulin 29, secured by suitable lacing forms a cover for the rear part. Thus access is provided for the sieve 25 and the top plate 28 is hingedly mounted so that the cylinder 17 can be removed or replaced.

The frame members 11 are preferably in the form of box or tubular beams, as shown in FIG. 4. Suitable cross members, not shown, space and reinforce the members 11. Horizontal plates 30, secured to members 11, extend outwardly therefrom. The front part of the left plate 30 provides a cat walk to facilitate inspection of sieve 25 and cylinder 17 when the tarpaulin 29 is removed, and the hinged plate 28 is swung back.

The grain bin 18 comprises side walls 31, secured to plates 30 at their outer edges (FIG. 4) and sloping front and rear walls 32 (FIGS. 2 & 3). Thus the width of the grain bin 18 is much greater than the spacing between the side walls 33 of the casing 15. This increases the capacity of the grain bin and contributes to the lowering of the center of gravity as the bin becomes filled.

The plates 30 close the top of the bin 18 outwardly of the frame members 11, but the central portion of the bin, being positioned beneath the lower sieve 26 and the barrier 27, is open so as to receive the clean grain dropping therefrom.

The increased width of the grain bin 18 permits a novel arrangement of the conveyor means for delivering the clean grain to a truck or wagon either stationary, or moving parallel with the combine 10 at the side or at the rear quarter.

As shown in FIGS. 2 and 4, a vertical pipe 34 extends upwardly from the bottom of the bin 18 and through one of the plates 30. A vertical auger 35, located within pipe 34, is driven from a gear box 36. The bottom of the pipe 34 communicates with shielded horizontally disposed auger conveyors 37 located in the V or bottom of the bin 18.

A turret 41 is mounted on pipe 34 for rotation on a vertical axis. Communicating with the upper end of turret 41 is a substantially horizontally disposed auger type grain conveyor 38 which is also driven from the gear box 36 by suitable means. It will be understood that conventional drive belt means and chain and sprocket means, not shown, are provided for driving the various assemblies, including the gear box 36 and the horizontal auger conveyors 37, from the engine 19.

A tension member 40, swivelly connected to a structural member of the side wall 33, supports the outer end of the conduit 38 and permits movement of same away from the transport position of FIG. 3.

The elements 34, 38 and 40 thus provide a boom type grain delivery means which can be swung back and forth to distribute the grain in the receptacle of the truck or wagon as the bin is being emptied. This is particularly useful when both the combine and the truck are stationary during the bin emptying operation.

A cantilevered drop frame 45 is welded to the underside of the frame members 11 along weld lines 46, as shown in FIG. 3. The lower portion of the drop frame 45 is reinforced by a transverse member 47. Steel pads 47a constitute an engine mount for engine 19. The engine 19, being located adjacent the discharge opening 48 of the combine through which the straw and chaff is discharged downwardly, is shielded from the discharge by sheets 49 and 49a, the former being removable to provide access to the engine. The engine 19 is located as low as possible by the drop frame 45 so as to contribute to the low center of gravity and still clear abrupt ground irregularities, such as levees. The engine location is thus readily available for servicing, and the drop frame 45 is open at the bottom to prevent the accumulation of combustible chaff and straw. The engine intake is located at the right side wall 33 of the casing 15 and is provided with a suitable air cleaner 50.

One feature of my invention resides in the location of the grain separating mechanism at a substantial elevation above the ground. As a result, it is possible to locate the fan 51 (FIG. 1) at an elevation such that it will not suck up the straw and chaff from a previously harvested row through its open bottom and side intake opening 52 (FIG. 2). The diagonally disposed feeder 20, 23 provides a substantial space for accommodating the fan 51 forwardly of the sieves 25 and 26, and provides space for a large area intake opening 52 in the side walls 33 at the desired elevation.

The rear steerable wheel means 13 may be a conventional two wheel truck or a single wheel which is supported by a rotatably mounted pillar such as pillar 53 shown in FIG. 3. The weight of the engine 19, being located rearwardly of the steerable wheel means 13, provides traction weight for the steerable wheel means 13 so that the combine 10 is readily maneuverable. Also the arrangement with the grain separation mechanism and the frame 11 located above the front wheels 12, permits the use of a three wheel arrangement with the single steerable rear wheel 13 of a flotation size equal to the front wheels. It is contemplated that all three wheels be independently driven by hydraulic motors, powered by a suitable pump driven from engine 19.

Thus, my invention provides not only lateral stability, but also a fore and aft balance which permits the use

I claim:

1. A combine comprising a longitudinally extending frame structure, front and rear wheel means supporting the frame structure at its front and rear ends respectively, a crop receiving header mounted on the front end of the frame structure and extending forwardly of said front wheel means, engine mounting means supported by the rear end of said frame structure and extending rearwardly of said rear wheel means, a casing mounted on said frame structure, a threshing cylinder rotatably mounted in said casing at the upper front part thereof, means for delivering crop harvested by the header to said threshing cylinder, grain separating mechanism located in said casing beneath and rearwardly of said threshing cylinder, a grain collecting bin disposed between said front and rear wheel means and below said frame structure and located in its entirety beneath said grain separating mechanism, said grain separating mechanism also having a portion extending rearwardly of said rear wheel means, an engine for driving said threshing cylinder and said grain separating mechanism and supported by said engine mounting means at a point rearwardly of said rear wheel means and beneath said rearwardly extending portion of said grain separating mechanism, whereby said rear positioned engine tends to balance the forwardly positioned header to increase the traction on said rear wheel means and the center of gravity of the combine is generally low and gets lower as the grain collecting bin becomes filled to provide increased lateral stability under load.

2. A combine as claimed in claim 1 in which said grain collecting bin extends laterally beyond the side walls of said casing.

3. A combine as claimed in claim 1 in which the elevation of said frame structure is greater than the diameter of said wheel means so that said wheel means are located beneath the mechanism contained in said casing, said rear wheel means being steerable and being of a diameter substantially equal to the diameter of said front wheel means.

4. A combine as claimed in claim 3 in which said rear wheel means comprises a single steerable rear wheel.

5. A combine as claimed in claim 1 in which said engine mounting means comprises a cantilevered drop frame secured to the rear end of said frame structure whereby the elevation of said engine above the ground is substantially less than the elevation of said frame structure.

6. A combine as claimed in claim 1 in which said grain separating mechanism includes an upper sieve, a lower sieve, air stream providing means located forwardly of said sieves and above said frame structure, and air inlet means located in a side wall of said casing adjacent said air stream providing means whereby the location of said air inlet means is sufficiently high above the ground as to avoid intake of straw lying on the ground surface.

7. A combine comprising a longitudinally extending frame structure, front and rear wheel means supporting the frame structure at its front and rear ends respectively, a crop receiving header mounted on the front end of the frame structure and extending forwardly of said front wheel means, engine mounting means supported by the rear end of said frame structure and extending rearwardly of said rear wheel means, a casing mounted on said frame structure, a threshing cylinder rotatably mounted in said casing at the upper front part thereof, means for delivering crop harvested by the header to said threshing cylinder, grain separating mechanism located in said casing beneath and rearwardly of said threshing cylinder, a grain collecting bin disposed between said front and rear wheel means and below said frame structure and located in its entirety beneath said grain separating mechanism, an engine for driving said threshing cylinder and said grain separating mechanism and supported by said engine mounting means at a point rearwardly of said rear wheel means whereby said rear positioned engine tends to balance the forwardly positioned header to increase the traction on said rear wheel means and the center of gravity of the combine is generally low and gets lower as the grain collecting bin becomes filled to provide increased lateral stability under load, said grain collecting bin extending laterally beyond the side walls of said casing, horizontal top plates extending between said frame structure and the side walls of said bin, a boom type grain delivery means comprising a first conveyor extending vertically from the bottom of said bin through one of said top plates, and a second conveyor communicating with said first conveyor near the upper end thereof and disposed at an angle thereto and mounted for swinging movement about a vertical axis whereby back and forth swinging movement of said second conveyor will distribute and grain as it is being deposited in a receptacle.

8. A combine comprising a longitudinally extending frame structure, front and rear wheel means supporting the frame structure at its front and rear ends respectively, a crop receiving header mounted on the front end of the frame structure and extending forwardly of said front wheel means, engine mounting means supported by the rear end of said frame structure and extending rearwardly of said rear wheel means, a casing mounted on said frame structure, a threshing cylinder rotatably mounted in said casing at the upper front part thereof, means for delivering crop harvested by the header to said threshing cylinder, grain separating mechanism located in said casing beneath and rearwardly of said threshing cylinder, a grain collecting bin disposed between said front and rear wheel means and below said frame structure and located in its entirety beneath said grain separating mechanism, an engine for driving said threshing cylinder and said grain separating mechanism and supported by said engine mounting means at a point rearwardly of said rear wheel means whereby said rear positioned engine tends to balance the forwardly positioned header to increase the traction on said rear wheel means and the center of gravity of the combine is generally low and gets lower as the grain collecting bin becomes filled to provide increased lateral stability under load, said casing having a hinged top wall located above said threshing cylinder providing access thereto, and the rear part of said casing being open at the top to provide access to said grain separating mechanism, a removable tarpaulin for covering said open top, said grain collecting bin extending laterally beyond the side walls of said casing, horizontal top plates extending between said frame structure and the side walls of said bin and forming a top wall for said laterally extended portions of said bin, the front part of one of said top plates providing a cat walk to permit access to said hinged top wall for opening same and inspecting said cylinder.

\* \* \* \* \*